United States Patent [19]

Ignatius et al.

[11] Patent Number: 5,012,609

[45] Date of Patent: May 7, 1991

[54] METHOD AND APPARATUS FOR IRRADIATION OF PLANTS USING OPTOELECTRONIC DEVICES

[75] Inventors: Ronald W. Ignatius; Todd S. Martin, both of Dodgeville; Raymond J. Bula, Cross Plains; Robert C. Morrow; Theodore W. Tibbitts, both of Madison, all of Wis.

[73] Assignee: Automated Agriculture Associates, Inc., Dodgeville, Wis.

[21] Appl. No.: 283,245

[22] Filed: Dec. 12, 1988

[51] Int. Cl.$^5$ .......................... A01C 1/00; A01G 9/20
[52] U.S. Cl. .......................................... 47/58; 47/39; 47/DIG. 6
[58] Field of Search ................ 47/58, 17, DIG. 6, 39; 250/458.1; 73/865.6

[56] References Cited

U.S. PATENT DOCUMENTS

| | | | |
|---|---|---|---|
| 3,233,146 | 2/1966 | Vacha | 47/17 |
| 3,514,668 | 5/1970 | Johnson et al. | 315/205 |
| 3,876,907 | 4/1975 | Widmayer | 47/DIG. 6 |
| 3,898,643 | 8/1975 | Ettlinger | 340/324 |
| 3,905,153 | 9/1975 | Enter | 165/2 |
| 3,930,335 | 1/1976 | Widmayer | 47/DIG. 6 |
| 3,931,695 | 1/1976 | Widmayer | 47/DIG. 6 |
| 4,037,148 | 7/1977 | Owens et al. | 323/17 |
| 4,084,905 | 4/1978 | Schreiber et al. | 250/458.1 |
| 4,146,993 | 4/1979 | Freeman, Sr. | 47/17 |
| 4,156,166 | 5/1979 | Shapiro et al. | 315/209 |
| 4,255,897 | 3/1981 | Ruthner | 47/65 |
| 4,396,872 | 8/1983 | Nutter | 315/308 |
| 4,626,065 | 12/1986 | Mori | 350/96.15 |
| 4,650,336 | 3/1987 | Moll | 250/458.1 |
| 4,724,633 | 2/1988 | Kadkade | 47/58 |
| 4,732,443 | 3/1988 | Mori | 350/96.10 |
| 4,749,916 | 6/1988 | Yamazaki | 47/DIG. 6 |
| 4,768,390 | 9/1988 | Baker et al. | 73/865.6 |
| 4,914,858 | 4/1990 | Nijssen | 47/58 |

FOREIGN PATENT DOCUMENTS

2140262 11/1984 United Kingdom ........... 47/DIG. 6

OTHER PUBLICATIONS

Young, E. C., "Light-Emitting Diode", *The New Penguin Dictionary of Electronics* Penguin Books 1983, p. 269.
Bickford, E. D. et al., "9.5 Xenon, Neon Lamps" *Lighting for Plant Growth* The Kent State University Press (1973), p. 136.
Frank Salisbury, Plant Physiology, 1969, pp. vii and 282-283.
John W. Mastalerz, The Greenhouse Environment, 1977, pp. 176-177.
Home & Garden Bulletin No. 187, Department of Agriculture, pp. 1, 12-19.
Robert H. Garwood, To Catch the Light: A Concise History of Photoelectric Sensing, 1988 pp. 49 & 52.
Lowell E. Campbell, Spectral Radiant Power of Lamps Used in Horticulture, 1974, pp. 952-956.

*Primary Examiner*—James R. Feyrer
*Attorney, Agent, or Firm*—Andrus, Sceales, Starke & Sawall

[57] ABSTRACT

Disclosed are a method and an apparatus for irradiation of plants using optoelectronic devices. In accordance with this invention, optoelectronic devices that emit radiant energy at the appropriate wavelength are operated in a continuous mode or pulsed asymmetrically at a frequency and level of electrical power that results in sufficient irradiance to support plant growth and development. The apparatus consists of: (1) an array of optoelectronic devices, primarily light emitting diodes, for producing irradiance in each of three different wavelength regions necessary for specific plant photobiological reactions, (2) a pulse generator and associated electric power driving components, and (3) an electric direct current (D.C.) power supply.

15 Claims, 6 Drawing Sheets

METHOD AND APPARATUS FOR IRRADIATION OF PLANTS USING OPTOELECTRONIC DEVICES

BACKGROUND OF THE INVENTION

1. Field of the Invention

The present invention relates to enhancing plant growth with electrical lighting systems, and more particularly to enhancing plant growth by using optoelectronic devices, primarily light emitting diodes, in a continuous or pulsing mode, to produce sufficient irradiance to support specific photobiological reactions.

2. Background Information

Plants that contain the green pigment chlorophyll can transform the carbon dioxide in the atmosphere into sugars which are the primary nutrient materials for all living things. The chlorophyll molecule initiates this transformation by capturing light energy and converting it into chemical energy. This process is called photosynthesis. The generalized equation for the photosynthetic process is given as:

$$CO_2 + H_2O + light \rightarrow (CH_2O) + O_2$$

The term ($CH_2O$) is an abbreviation for the basic chemical energy building block emanating from the photosynthetic process that is used for the synthesis of all plant components.

The radiant energy absorbed by chlorophyll is within that portion of the electromagnetic spectrum that enables humans to see. However, the absorption spectrum of chlorophyll is not the same as that for the human eye. Leaves of plants absorb violet, blue, orange, and red wavelengths most efficiently. The green and yellow wavelengths, to which the human eye is most sensitive, are reflected or transmitted and thus are not as important in the photosynthetic process (F. Zcheile and C. Comer. 1941. Botanical Gazette, 102:463.).

The interaction between chlorophyll and light quanta (photons) involves the sciences of molecular physics and spectrosopy. A few fundamental considerations of this interaction, as defined by these sciences, need to be discussed to provide some understanding of the behavior of photoactive plant pigments. These considerations are also pertinent to an understanding of the nature of this invention.

Light comes in discrete packets of energy termed quanta or photons. The energy in each photon is inversely proportional to the wavelength of the radiation. A photon of blue light has more energy than a photon of red light. Another fundamental consideration is that a light absorbing pigment, such as chlorophyll, can absorb only one photon at a time. A molecule of chlorophyll that has absorbed a photon is called an "excited" molecule. An "excited" molecule is ready to take part in a chemical reaction. Molecules in the normal or "unexcited" state do not take part in such chemical reactions. This excitation energy is the energy transferred in the photosynthetic process.

The lifetime of this excited state, however, is very short, in the pico and nanosecond range. Unless the excited molecule can transfer the excitation energy to an appropriate "acceptor" unit, the chance for a chemical reaction is lost. Other events, such as fluorescence or long wavelength radiation, will have dissipated the energy between the moment of excitation and the time of encounter with the "acceptor" unit if the time between such an encounter exceeds the lifetime of the excited state.

Eventual utilization of the "captured energy" in the photosynthetic process involves enzymatic reactions that include the reduction of carbon dioxide leading to the synthesis of sugars as the "first" products of photosynthesis. While the time constants of the primary photochemical process are very short, the time constants for the enzymatic reactions are relatively long; being on the order of micro- or milliseconds. It has been experimentally demonstrated that when light flashes of 100 microseconds duration follow each other too quickly, the light is not fully utilized (B. Kok. 1956. Photosynthesis in flashing light. Biochim. et Biophys. Acta, 21:245-258.). Extending the time of the dark period to about 20 milliseconds increased the relative "yield" per flash of light.

Although the capture of light energy for chemical purposes by the chlorophyll molecule makes photosynthesis the most important biological process, other light dependent reactions that regulate the metabolism of a plant are important. These photobiological reactions involve the plant responses identified as photomorphogenesis, phototropism, and photoperiodism. These photobiological reactions require very low levels of light as compared to photosynthesis. Also, the radiant energy wavelengths involved in these reactions differ from those most effective in the photosynthetic reaction.

Consequently, an electric light source for plants must not only provide an adequate intensity of light but also provide light of the proper spectral characteristics to meet the plant's requirements. A further important consideration of an electric light source pertains to the efficiency of conversion of the electricity to light with the desired spectral characteristics. The most commonly used electric light sources for plant growth are fluorescent and high pressure sodium lamps. These lamps have electrical conversion efficiencies ranging from 20 to 30 percent. Efficiencies significantly greater than this do not appear likely due to limitations inherent in the basic design of these types of lamps. Thus, a more effective electric light source for plant growth is desirable.

SUMMARY OF THE INVENTION

Disclosed are a method and an apparatus for irradiation of plants using optoelectronic devices, primarily light emitting diodes (LED's). The optoelectronic devices produce light at the appropriate wavelengths and can be operated in a continuous mode or pulsed asymmetrically at a frequency and level of electrical power that results in sufficient irradiance to support plant growth and development. The apparatus consists of: (1) an array of optoelectronic devices, (2) a pulse generator and associated electric power driving components, and (3) an electric direct current (D.C.) power supply.

The optoelectronic device array contains three distinct types of light emitting devices that emit radiation in specific regions of the electromagnetic spectrum. Most of the devices of this array are light emitting diodes that have a peak emission in the red region of the spectrum, i.e. in the range of 620 to 680 nm. A small amount of the devices in the array are also light emitting diodes but have peak emission in the range of 700 to 760 nm. Another small amount of the devices have a peak emission in the spectral region of 400 to 500 nm and could be light emitting diodes or neon lamps. Irradiance in each of these wavelength regions is involved in specific plant processes. The 620–680 nm irradiance is involved in the primary photochemical, or energy gathering, reactions of the photosynthetic process. The 700 to 760 nm irradiance is involved in photomorphogenesis and specific aspects of the photosynthetic process. The 400 to 500 nm irradiance is involved in the phototropic and photomorphogenic plant processes. Since 620–680 nm irradiance is the primary source of energy for the photosynthetic process, devices with a peak emission in this range comprise the major portion of the optoelectronic device array. Only small amounts of the 700 to 760 and 400 to 500 nm irradiance are required to saturate the plant's requirements in these spectral regions.

The pulse generator provides an asymmetric pulse to the associated electric power components to drive the optoelectronic device array. The on-time and off-time duration of the electric power pulse is synchronized to the time constants involved in the primary photochemical interaction of the chlorophyll molecule and the time constants involved in the enzymatic reactions of the photosynthetic process. The on-time of the light emitting diode array is on the order of 1 to 2 percent. This results in a duty cycle that permits driving the light emitting diodes at electric power levels significantly in excess of those permitted if the devices were driven in a continuous duty mode. When the light emitting diode array is pulsed at these electric power levels, the irradiance level emitted by the devices is sufficient to support plant growth and development. Under such conditions the electrical conversion efficiency of this array is significantly better than any electric lighting system currently available for plant lighting.

BRIEF DESCRIPTION OF THE DRAWINGS

This invention can be better understood by reference to the following detailed description when considered in connection with the accompanying drawings illustrating the invention wherein.

DETAILED DESCRIPTION OF THE INVENTION

Figure 1:
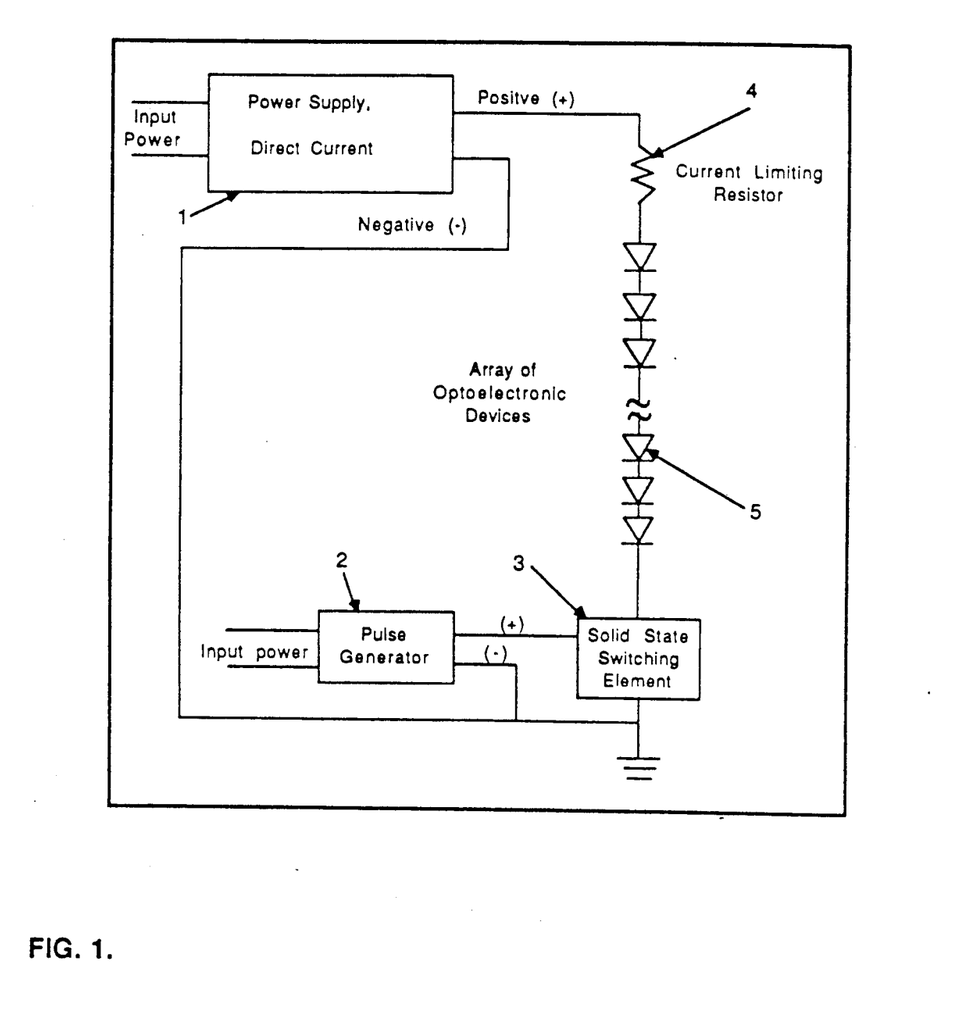
FIG. 1 is a block diagram, illustrating the components of the apparatus used to provide the light required by plants for growth and development.

In FIG. 1, a power supply 1 converts normally available alternating current (A.C.) electrical power to direct current (D.C.) electrical power which is used to drive optoelectronic devices. A pulse generator 2 provides a bias current to a solid state switching element 3 at a preselected frequency and duty cycle. Current flows through a current limiting resistor 4 and an optoelectronic device array 5 only during the time a bias current is applied to the solid state switching element 3. The current flowing through each optoelectronic device in array 5 results in emission of radiant energy from the device. The spectral characteristics of the emitted radiant energy depends on the composition of the materials used in the fabrication of the optoelectronic device. The current limiting resistor 4 limits the amount of current to the optoelectronic devices to prevent excessive current from passing through the device and causing a failure.

Figure 2:
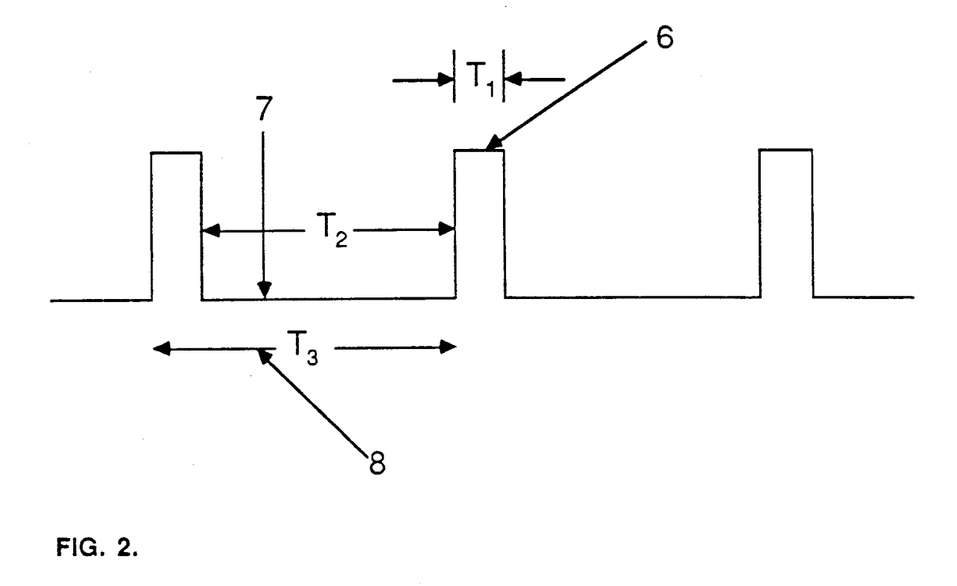
FIG. 2 is an illustration of the asymmetrical wave form.

FIG. 2 illustrates an asymmetrical wave form that is used to pulse the optoelectronic device array 5. Time period $T_1$ designated by the numeral 6 is the duration time the electric power is applied to the optoelectronic device array 5. Time period $T_2$ designated by the numeral 7 is the duration time no electric power is applied to the optoelectronic device array 5. Time period $T_3$ designated by the numeral 8 is the duration of one pulse cycle. The electrical potential of the $T_1$ 6 pulse must be adequate to cause the solid state driving components to conduct electric current from the optoelectronic device array 5 to ground. The electric potential of the $T_2$ 7 pulse must be low enough to not allow any current to pass from the optoelectronic device array 5 through the solid state driving components to ground.

Figure 3:
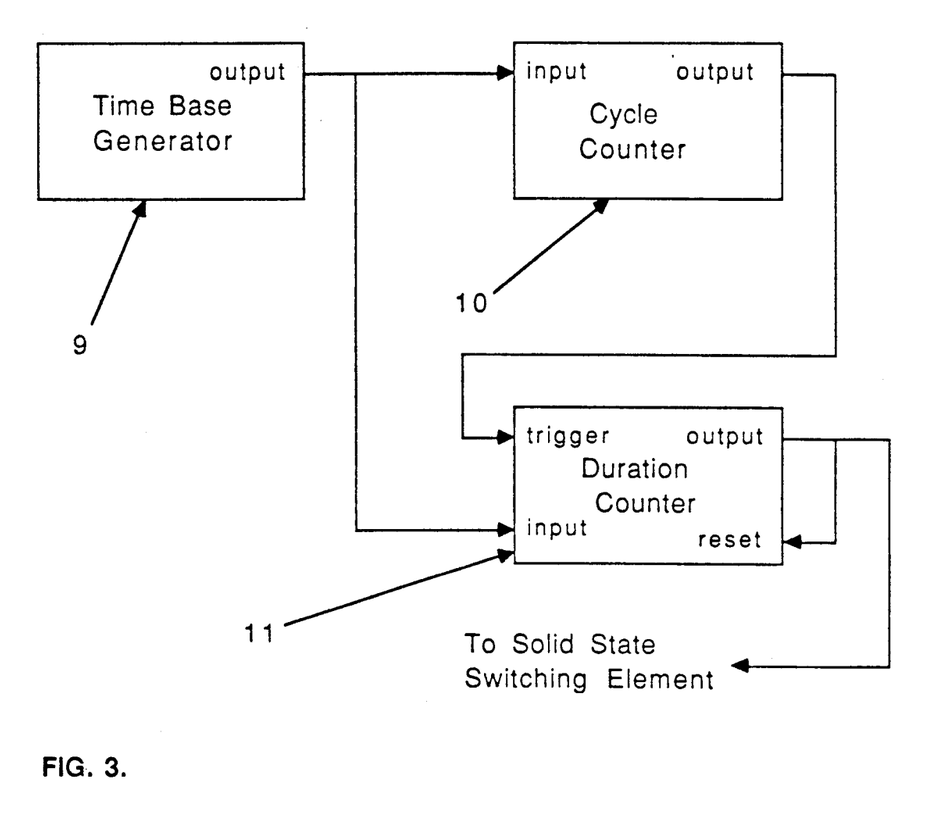
FIG. 3 is a block diagram, illustrating the pulse generator that generates the asymmetric pulses to the electric power driving components.

FIG. 3 is a block diagram of the components of pulse generator 2 that provide the asymmetrical wave form. A time base generator 9 is an integrated circuit capable of producing pulses with a time duration from 100 nanoseconds to 10 microseconds. Both cycle counter 10 and duration counter 11 are integrated circuits capable of counting pulses generated by the time base generator 9. The cycle counter 10 output provides a timing pulse for every time period $T_3$ 8. This timing pulse triggers the duration counter 11, thereby enabling duration counter 11 output to switch to the $T_1$ 6 state. The output of the duration counter 11 remains in the $T_1$ 6 state until a specified count has been reached. When the specified number of pulses are counted by the duration counter 11 the output switches to the $T_2$ 7 state. The $T_2$ 7 output state activates the reset input to the duration counter 11 and thus preventing additional counting of the pulses generated by the time base generator 9. The next pulse from cycle counter 10 inactivates the reset input of the duration counter 11 which initiates a repeat of the timing cycle.

Pulsing the electrical power to the optoelectronic device array accomplishes two purposes: (1) an asymmetric pulse allows driving the optoelectronic device array at power levels far in excess of continuous duty levels, thereby providing the irradiation levels required for plant growth and development, and (2) the asymmetrical pulsing cycle can be synchronized to the time constants of the various aspects of the energy gathering and energy conversion processes of photosynthesis. This results in a high efficiency of converting electricity to irradiation for plant growth and development.

An alternative to the functions provided by the components shown in FIG. 3 could be provided by using a microprocessor programmed to accomplish the described functions, or operate the optoelectronic devices in a continuous mode.

Figure 4:
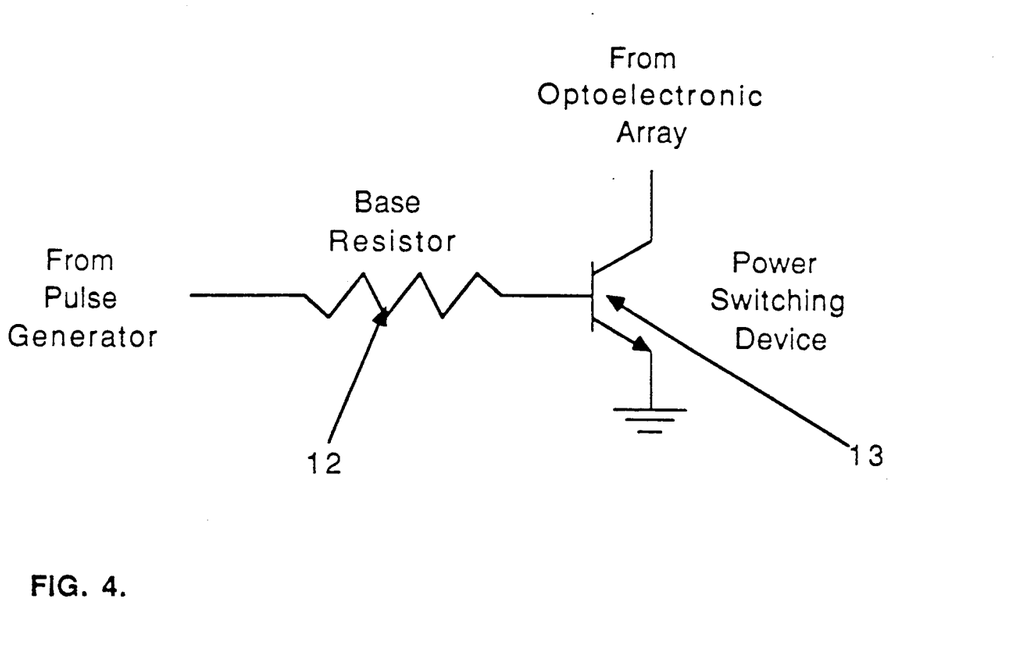
FIG. 4 is a circuit diagram, illustrating the solid state switching element and components that drive the optoelectronic device array.

FIG. 4 is a circuit diagram of the solid state switching element 3. The components of the solid state switching element 3 include a base resistor 12 and a power switching device 13, such as a power transistor. The function of the power switching device 13 is to control the current passing from the optoelectronic device array 5 to ground. During the $T_1$ 6 time period the power switching device 13 allows current to pass from the optoelectronic device array 5 to ground. During the time period $T_2$ 7, the power switching device is in a high impedance state thereby preventing flow of current from the optoelectronic device array 5 to ground. Base resistor 12 is sized to assure that sufficient base current is provided to saturate the power switching device 13 during the $T_1$ 6 time period.

Figure 5:
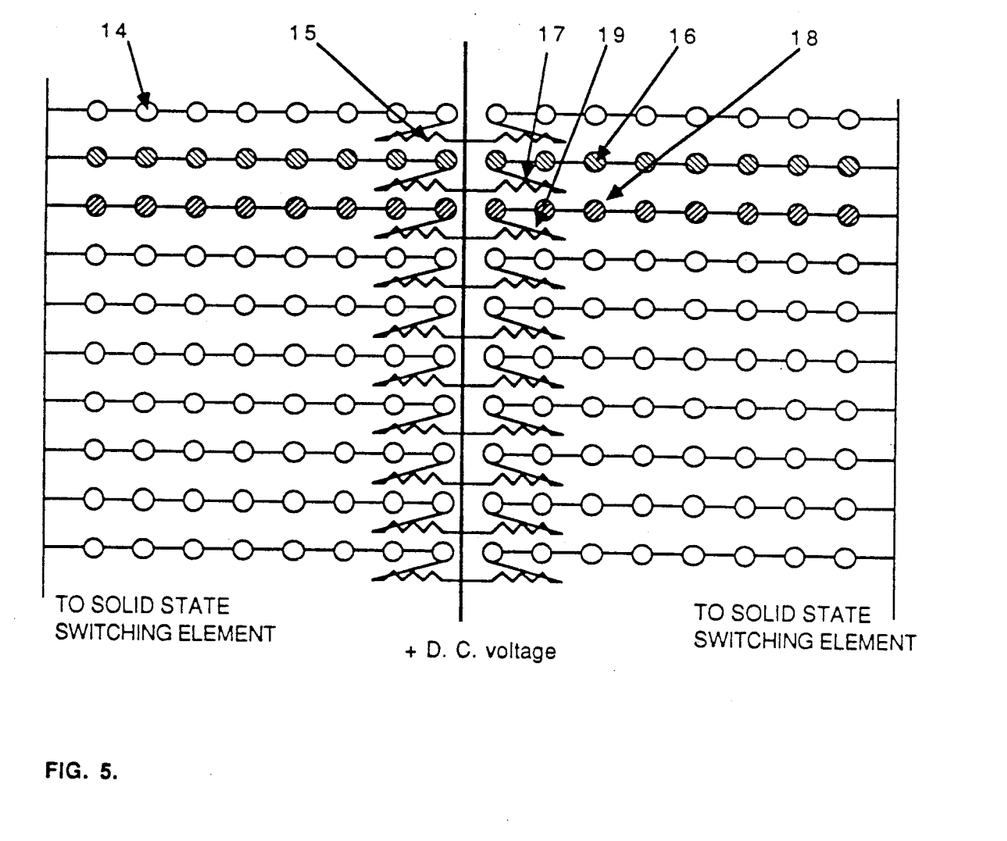
FIG. 5 is a circuit diagram, illustrating the optoelectronic device array that provides the required irradiance for plant growth and development.

The optoelectronic device array 5 shown in FIG. 5 consists of a number of devices connected both in series and in parallel. The optoelectronic device 14 is a light emitting diode having a peak emission between 620 and 680 nm. This light emitting diode represents the majority of devices in the array because it provides the radiant energy that interacts with the chlorophyll molecule to produce the "excited" state. The peak emission of light emitting diode 14 coincides with one of the absorption peaks of chlorophyll. This matching of light emitting diode 14 to the absorption peak of chlorophyll is one of the contributing factors toward the electrical efficiency of this invention in providing light for plant growth.

A number of light emitting diodes 14 are connected in series to the direct current power supply 1 with a current limiting resistor 15. The number of light emitting diodes 14 connected in series and the value of the current limiting resistor 15 are dependent on the voltage of the direct current power supply 1, the electrical characteristics of light emitting diode 14, and the desired level of current applied to light emitting diode 14. A sufficient number of these series-connected light emitting diodes 14 are connected in parallel to the direct current power supply 1. These parallel arrays would be arranged in a panel configuration and the panels would be mounted in a ganged fashion to irradiate a large plant growing area.

Optoelectronic device 16 is a light emitting diode with a peak emission range of 700–760 nm. This radiant energy is required for excitation of the photobiologically active molecules involved in a number of photomorphogenic responses of plants. Radiant energy at 700 to 760 nm is also involved in enhancing the energy transformation processes involved in photosynthesis. The number of light emitting diodes 16 in the total optoelectronic array is much less than the number of light emitting diodes 14 because only a small amount of radiant energy is required to produce the desired photomorphogenic responses. As was previously described, the light emitting diodes 16 are connected in series to the direct current power supply 1 with a current limiting resistor 17. The number of light emitting diodes 16 connected in series and the value of current limiting resistor 17 are dependent on the voltage of the direct current power supply 1, the electrical characteristics of light emitting diode 16, and the desired current to be applied to light emitting diode 16. A sufficient number of these series-connected light emitting diodes 16 are connected in parallel to the direct current power supply 1 to provide the desired level of irradiance in the spectral region of 700–760 nm.

Optoelectronic device 18 is either a light emitting diode or a neon lamp, either of which emit radiant energy in the spectral region of 400 to 500 nm. This radiant energy is required for excitation of the photobiologically active molecules involved in the synthesis of chlorophyll and the phototropic and other photomorphogenic responses of plants. The number of optoelectronic devices 18 in the total optoelectronic array is approximately the same as the number of light emitting diodes 16 and much less than the number of light emitting diodes 14 because only a small amount of radiant energy is required to produce the desired photomorphogenic and phototropic responses. The optoelectronic devices 18 are connected in series to the direct current power supply 1 with a current limiting resistor 19. The number of optoelectronic devices 18 and the value of current limiting resistor 19 are dependent on the voltage of the direct current power supply 1, the electrical characteristics of the optoelectronic device 18, and the desired current to be applied to optoelectronic device 18. These conditions are particularly important if a light emitting diode or a neon lamp is selected as the device of choice. A sufficient number of these series-connected optoelectronic devices 18 are connected in parallel to the direct current power supply 1 to provide the desired level of irradiance in the spectral region of 400 to 500 nm.

Figure 6:
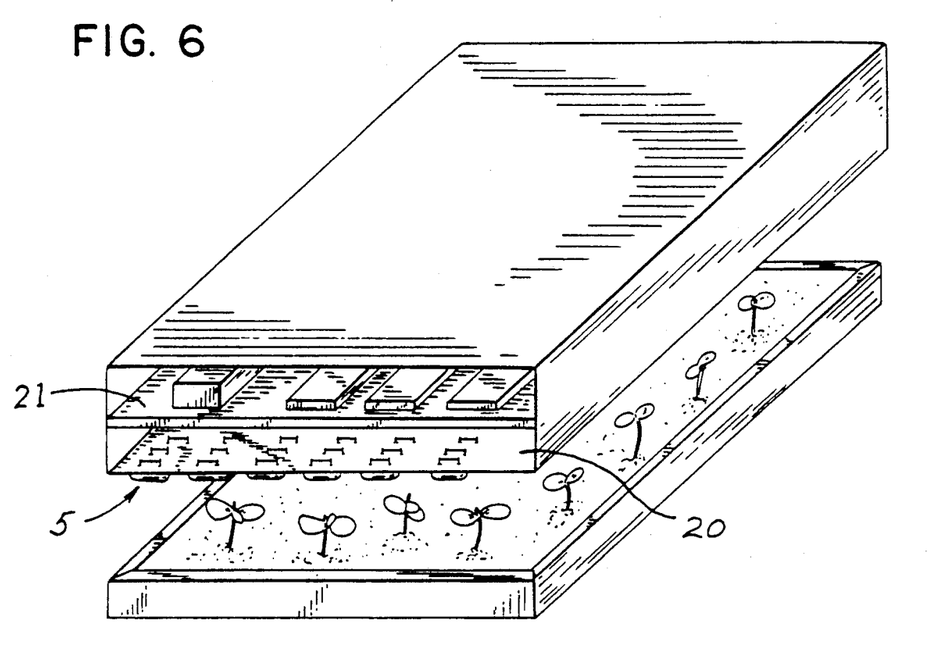
FIG. 6 is a fragmentary perspective view, illustrating the optoelectronic device array, the pulse generator and associated electric power driving components, and the direct current electric power supply as a light source for plant lighting.

FIG. 6 illustrates a fragmentary perspective view of an exemplary lighting unit described in this disclosure. The optoelectronic array 5 is mounted on a board 20 with a reflecting lower surface. The reflecting lower surface directs a maximum amount of the radiant energy emitted by the devices toward the plant growing surface located parallel to the optoelectronic device array 5. The current limiting resistors 4 are also mounted on board 20. The direct current power supply 1, the pulse generator 2, and the solid state switching element 3 are mounted on board 21 positioned above the optoelectronic device array board 20. This arrangement of boards 20 and 21 would allow for cooling the electronic components if desired. Boards 20 and 21 function effectively in any mounting position so as to facilitate the use of this lighting system in various types of applications.

Various modes of carrying out the invention are contemplated as being within the scope of the following claims particularly pointing out and distinctly claiming the subject matter regarded as the invention.

We claim:

1. A method for providing radiant energy to support plant growth and development comprising the step of:
  exposing a plant to radiant energy provided by an array of light emitting diodes having a maximum spectral emission that matches the maximum absorption of chlorophyll and meets the photomorphogenic and phototropic requirements of a plant at a sufficient intensity and duration to drive photosynthesis at a rate sufficient to support plant growth and development from germination to maturity.

2. The method of claim 1 wherein said array of light emitting diodes provide light having peak emission in the range of 620 to 680 nm that matches the maximum absorption of chlorophyll.

3. The method of claim 1 wherein said array of light emitting diodes provide light having peak emission in the range of 700 to 760 nm to meet the photomorphogenic requirements of a plant.

4. The method of claim 1 wherein said array of light emitting diodes provide light having peak emission in the range of 400 to 500 nm to meet the photomorphogenic and phototropic requirements of a plant.

5. The method of claim 1 wherein said plant is exposed to radiant energy from each of the light emitting diodes in the array simultaneously.

6. The method of claim 5 further including the step of controlling electrical current to said array of light emitting diodes so as to pulse said light emitting diodes for a desired time duration in the range of 100 nanoseconds to 100 microseconds.

7. The method of claim 6 further including the step of synchronizing the time duration and frequency of said pulse with time constants involved in the photosynthetic process reactions.

8. An apparatus for providing radiant energy for plant growth and development comprising:
an array of light emitting diodes including first light emitting diode means having a peak emission in the 620 to 680 nm spectral region, second light emitting diode means having a peak emission in the 700 to 760 nm spectral region, and third light emitting diode means having a peak emission in the 400 nm to 500 nm spectral region,
a source of electric current; and
control means for controlling said electric current to said light emitting diode means so as to pulse said light emitting diode means for a desired time duration; and, means for positioning plants in proximity to said array of light emitting diodes.

9. The apparatus of claim 8 wherein each of said first, second, and third light emitting diode means comprises a light emitting diode.

10. The apparatus of claim 8 wherein said control means provides a continuous mode of operation.

11. The apparatus of claim 8 wherein said control means provides a pulsed mode of operation.

12. The apparatus of claim 8 wherein said source of electric current means comprises a direct current power supply.

13. The apparatus of claim 8 wherein said control means includes pulse generator means and power switching means responsive to an output signal from said pulse generator means for controlling said electric current through said array of light emitting diodes.

14. The apparatus of claim 13 wherein said power switching means comprises a power transistor.

15. The apparatus of claim 13 wherein said pulse generator means comprises a time base generator means for producing a timing pulse of a desired time duration, cycle counter means responsive to said timing pulse for producing a trigger signal, and duration counter means responsive to said trigger signal for counting a predetermined number of timing pulses and thereafter producing said output signal.

* * * * *